United States Patent
Eros et al.

(10) Patent No.: US 9,366,545 B2
(45) Date of Patent: Jun. 14, 2016

(54) DIRECTIONAL LOCATION SYSTEM FOR A PORTABLE ELECTRONIC DEVICE

(75) Inventors: Steve K. Eros, Waterloo (CA); Nicholas Blommesteijn, Ottawa (CA)

(73) Assignee: BLACKBERRY LIMITED, Waterloo, Ontario (CA)

(*) Notice: Subject to any disclaimer, the term of this patent is extended or adjusted under 35 U.S.C. 154(b) by 1956 days.

(21) Appl. No.: 11/332,250

(22) Filed: Jan. 17, 2006

(65) Prior Publication Data

US 2007/0168123 A1 Jul. 19, 2007

(51) Int. Cl.
*G01C 21/36* (2006.01)
*G01C 23/00* (2006.01)

(52) U.S. Cl.
CPC ........... *G01C 23/00* (2013.01); *G01C 21/36* (2013.01)

(58) Field of Classification Search
USPC .......................................... 701/213
See application file for complete search history.

(56) References Cited

U.S. PATENT DOCUMENTS

| | | | | |
|---|---|---|---|---|
| 6,046,688 | A * | 4/2000 | Higashikata et al. | 340/995.27 |
| 7,142,872 | B2 * | 11/2006 | Park et al. | 455/456.1 |
| 2003/0195695 | A1 * | 10/2003 | Maruyama et al. | 701/200 |
| 2004/0006426 | A1 * | 1/2004 | Armstrong et al. | 701/213 |
| 2004/0087314 | A1 * | 5/2004 | Duncan | 455/456.1 |
| 2004/0121784 | A1 * | 6/2004 | Park et al. | 455/456.1 |
| 2004/0203923 | A1 * | 10/2004 | Mullen | 455/456.1 |
| 2005/0065720 | A1 * | 3/2005 | Lewis et al. | 701/207 |
| 2006/0040680 | A1 * | 2/2006 | Daurensan | 455/457 |
| 2008/0287112 | A1 * | 11/2008 | Mullen | 455/414.3 |

FOREIGN PATENT DOCUMENTS

| | | |
|---|---|---|
| EP | 1378878 A | 1/2004 |
| GB | 2359888 A | 9/2001 |

OTHER PUBLICATIONS

European Search Report, European Patent Office, May 15, 2006, Munich.

* cited by examiner

*Primary Examiner* — Shelley Chen
(74) *Attorney, Agent, or Firm* — Perry + Currier, Inc.

(57) ABSTRACT

A method for a first portable electronic device to locate a second portable electronic device includes: determining location coordinates of the first portable electronic device, receiving location coordinates from the second portable electronic device, determining a relative direction from the first portable electronic device to the second portable electronic device, generating an arrow on a display of the first portable electronic device, the arrow representing a direction from the first portable electronic device to the second portable electronic device. Wherein the direction of the arrow is automatically updated based on changes in the location coordinates of the first portable electronic device and the location coordinates of the second portable electronic device.

24 Claims, 5 Drawing Sheets

DIRECTIONAL LOCATION SYSTEM FOR A PORTABLE ELECTRONIC DEVICE

FIELD

The present disclosure relates to a portable electronic device, in particular, a directional location system for a portable electronic device.

BACKGROUND

With the advent of GPS technology, it has become possible to determine the precise location of any GPS receiver on the globe. GPS technology is often combined with mapping software in order to visually indicate the location of a GPS receiver on a map. Some of the portable devices that are currently available on the market include a screen for displaying a map along with a visual indicator that represents the GPS location of the device, however, there are several drawbacks associated with these devices.

Downloading geographic maps onto the portable devices from a network is very time consuming and there are often licensing fees associated with map use. In addition, the size of the screen is typically minimized in order to reduce the overall size and weight of the portable device. This may result in a user spending valuable time attempting to understand the map if insufficient information is provided on a single screen.

As with any map, time is also spent becoming oriented with one's surroundings and correlating them to the map on the screen. If the user is not particularly map literate, it may take a very long time for the user to determine his or her location. Further, in a region that is poorly mapped or a region that includes few roads or landmarks, mapping one's GPS location on a portable device may not be very useful.

BRIEF DESCRIPTION OF THE DRAWINGS

The following Figures set forth an embodiment in which like numerals denote like parts and in which.

DETAILED DESCRIPTION

Figure 1:
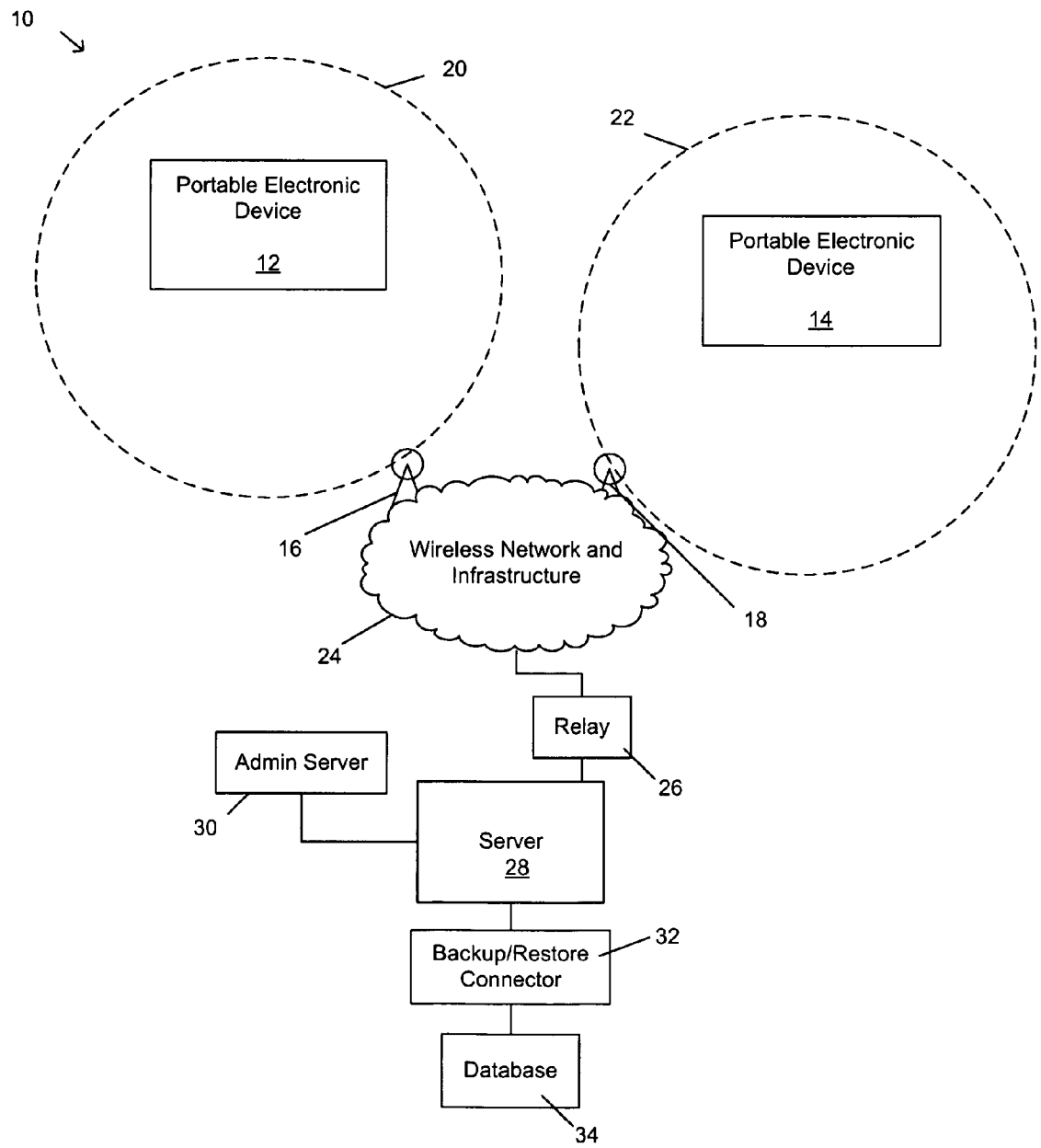
FIG. 1 is a functional block diagram of a communication system for portable electronic devices according to the embodiment.

Referring to FIG. 1, a functional block diagram of a communication system 10, a first portable electronic device 12 and a second portable electronic device 14 is generally shown. The portable electronic devices 12, 14 and the communication system 10 are operable to effect communications over a radio communications channel therebetween. A first user (not shown) is associated with the first portable electronic device 12 and a second user (not shown) is associated with the second portable electronic device 14 and both portable electronic devices 12, 14 are Global Positioning System (GPS) enabled.

For the purpose of illustration, the communication system 10 is functionally represented in FIG. 1 and includes a first base station 16 and a second base station 18. Base station 16 defines a coverage area, or cell 20 within which communications between the base station 16 and the portable electronic device 12 can be effected. Similarly, base station 18 defines a cell 22. It will be appreciated that the portable electronic devices 12, 14 are movable within their respective cells 20, 22 and can be moved to coverage areas defined by other cells, including those that are not illustrated in the present example.

The base stations 16, 18 are part of a wireless network and infrastructure 24 that provides a link to the portable electronic devices 12, 14. The wireless network and infrastructure 24 includes additional base stations (not shown) that provide the other cells referred to above. Data is delivered to the portable electronic devices 12, 14 via wireless transmission from base stations 16, 18, respectively. Similarly, data is sent from the portable electronic devices 12, 14 via wireless transmission to the base stations 16, 18.

Wireless networks and infrastructures include, for example, data-centric wireless networks, voice-centric wireless networks, or dual-mode wireless networks. For the purpose of the present exemplary embodiment, the wireless network and infrastructure 24 includes a dual-mode wireless network that supports both voice and data communications over the same physical base stations.

The communication system 10 further includes a relay device 26 that is connected to the wireless network and infrastructure 24 and to a server 28. It will be understood that the functions provided by the relay device 26 and the server 28 can be embodied in the same device. The server 28 is also connected to an administration server 30, as shown. The administration server 30 provides administrative services to and control over the server 28.

The server 28 is also functionally coupled through a connector 32 to a backup/restore database 34. Other connectors and databases can be provided, for example, for synchronization purposes. The connector 32 receives commands from the server 28. It will be understood that the connector 32 is a functional component and can be provided by way of an application on the server 28. The backup/restore database 34 is used for storing data records, including, for example, copies of Short Message Service (SMS) or Personal Identification Number (PIN) messages sent from the portable electronic devices 12, 14.

Figure 2:
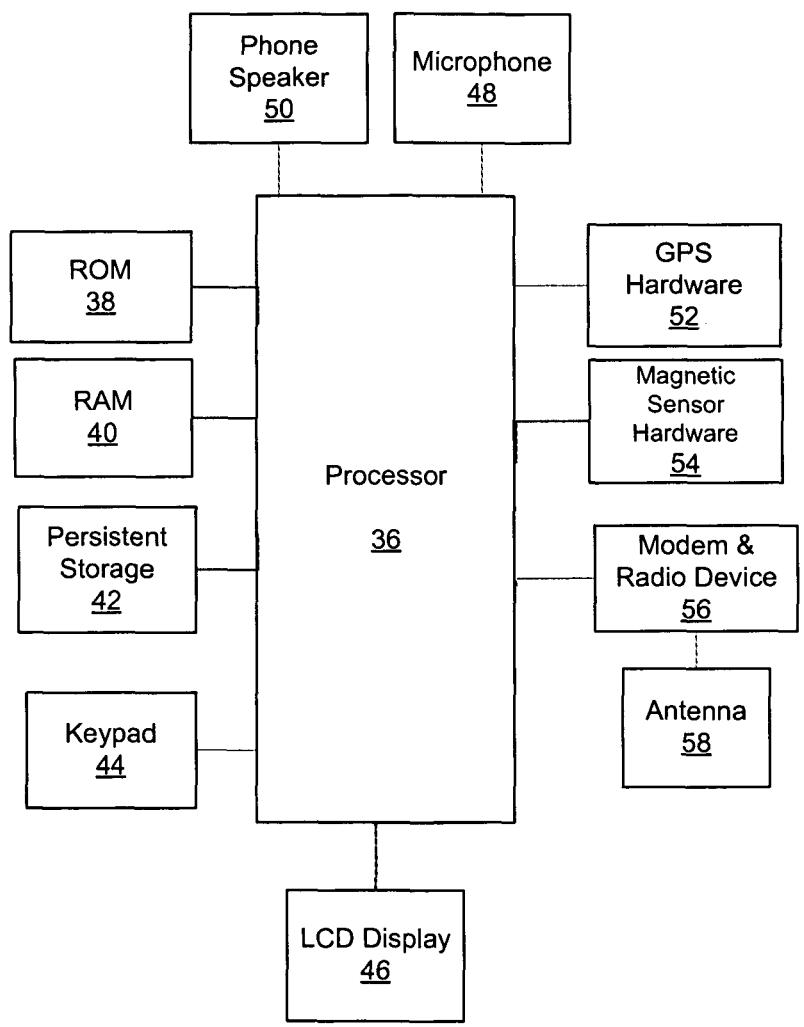
FIG. 2 is a functional block diagram of certain components at least one of the portable electronic devices of FIG. 1.

Referring now to FIG. 2, a block diagram of certain components within the portable electronic devices 12, 14 is shown. In the present embodiment, the portable electronic devices 12, 14 are based on the computing environment and functionality of a wireless personal digital assistant (PDA). It will be understood, however, that the portable electronic devices 12, 14 are not limited to wireless personal digital assistants. Other portable electronic devices are possible, such as cellular telephones, smart telephones, and laptop computers. Referring again to the present embodiment, the portable electronic devices 12, 14 are based on a microcomputer including a processor 36 connected to a read-only-memory (ROM) 38 that contains a plurality of applications executable by the processor 36 that enables each portable electronic device 12, 14 to perform certain functions including, for example, PIN message functions, SMS message functions and cellular telephone functions. The processor 36 is also connected to a random access memory unit (RAM) 40 and a persistent storage device 42 which are responsible for various non-volatile storage functions of the portable electronic devices 12, 14. The processor 36 receives input from various input devices including a keypad 44. The processor 36 outputs to various output devices including an LCD display 46. A microphone 48 and phone speaker 50 are connected to the processor 36 for cellular telephone functions. The processor 36 is also connected to location determining GPS hardware 52, magnetic sensor hardware 54 and a modem and radio device 56. The modem and radio device 56 is used to connect to wireless networks using an antenna 58. The modem and radio device 56 transmits and receives voice and data communications to and from the portable electronic devices 12, 14 through the antenna 58.

Each portable electronic device 12, 14 is operable to effect two way communication of voice and data. Thus, the portable electronic devices 12, 14 transmit and receive voice communications over the wireless network and infrastructure 24 via wireless communications with the base stations 16, 18, respectively over a radio communications channel. In this manner, the first portable electronic device 12 may communicate with the second portable electronic device 14 and vice versa.

Figure 3:
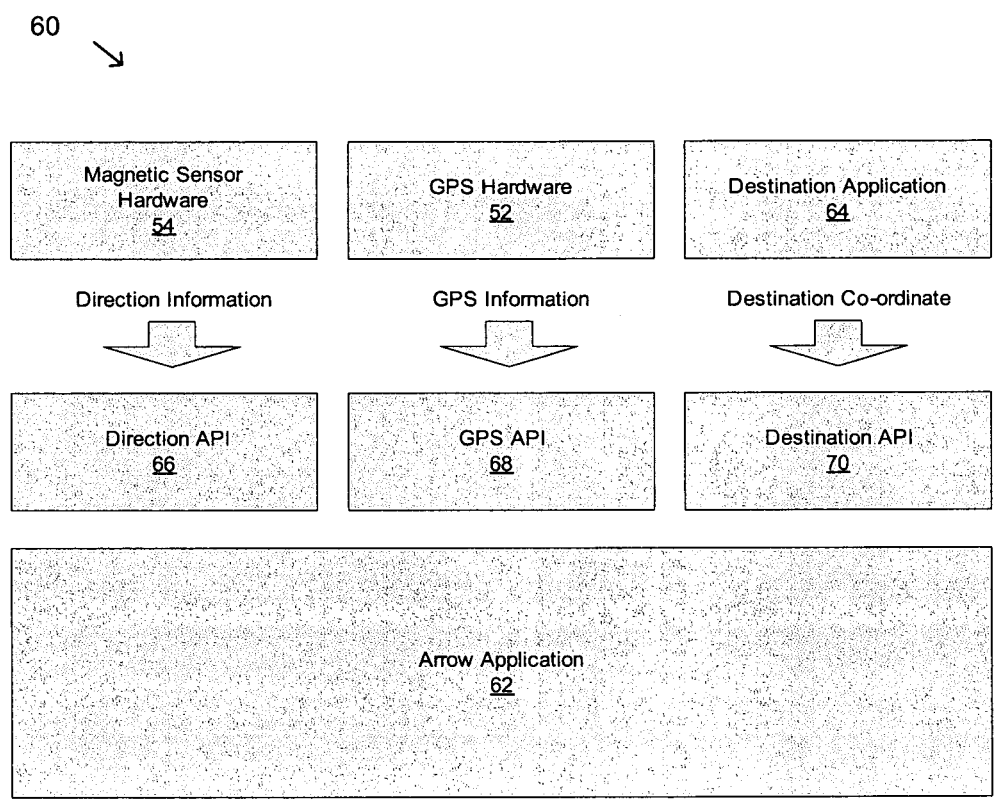
FIG. 3 is a functional block diagram of a pointing system of the portable electronic device of FIG. 2.

Referring to FIG. 3, a functional block diagram of a pointing system 60 of the first portable electronic device 12 is generally shown. The pointing system 60 includes an arrow application 62 that obtains information from magnetic sensor hardware 54, GPS hardware 52 and destination application 64. The destination application 64 is stored in ROM 38 and executed by the processor 36.

Figure 4:
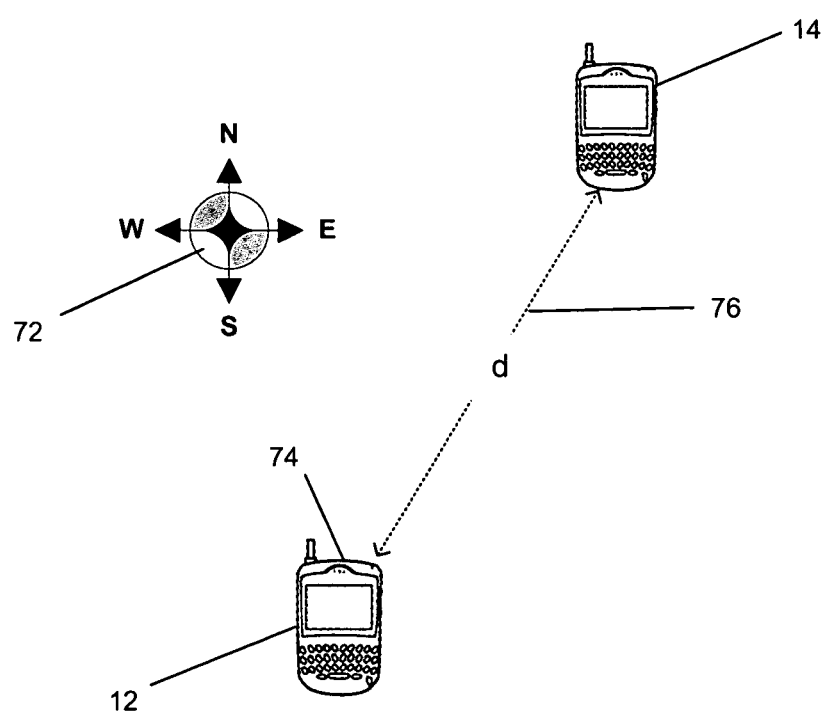
FIG. 4 is an overhead view showing the portable electronic devices of FIG. 1 separated by distance d.

The magnetic sensor hardware 54 includes an electronic compass (not shown) that determines the direction toward which the forward end 74 of the first portable electronic device 12 is pointed. As shown in FIG. 4, the forward end 74 of both portable electronic devices 12, 14 is pointed towards north, as indicated by north arrow 72. It will be appreciated that FIG. 4 is provided by way of example only and the devices 12, 14 may be pointed in any direction at any given time.

The magnetic sensor hardware 54 communicates with a direction Application Programming Interface (API) 66 to provide the direction information of the first portable electronic device 12 to the arrow application 62. The direction information is provided in standard compass format, such as 30° north, for example.

In one embodiment, the electronic compass includes magnetic sensor HMC1041Z, which is manufactured by Honeywell. Other suitable magnetic sensors manufactured by Honeywell or other manufacturers may alternatively be used.

The GPS hardware 52 includes a GPS receiver (not shown) for determining the geographic location coordinates of the first portable electronic device 12. The GPS receiver is able to determine the latitude, longitude and altitude of the first portable electronic device 12. Operation of GPS receivers is well-known in the art and therefore will not be described here. The GPS hardware 52 communicates with a GPS API 68, which provides the geographic coordinates to the arrow application 62.

The destination application 64 provides geographic location coordinates of a destination to the arrow application 62 via a destination API 70. In one embodiment, the destination is a location of the second portable electronic device 14. Similar to the first portable electronic device 12, the second portable electronic device 14 includes a GPS receiver (not shown) for determining geographic location coordinates thereof. Once the coordinates have been determined locally, they are sent to the destination application 64 of the first portable electronic device 12. The geographic coordinates of the second portable electronic device are updated and sent on a continuous basis to the first portable electronic device 12.

The destination application 64 further includes a selection portion (not shown), which allows the first user to specify which device to track. In this embodiment, the first user tracks the second portable electronic device 14. By selecting the desired device, signals from other devices are not processed.

Figure 5:
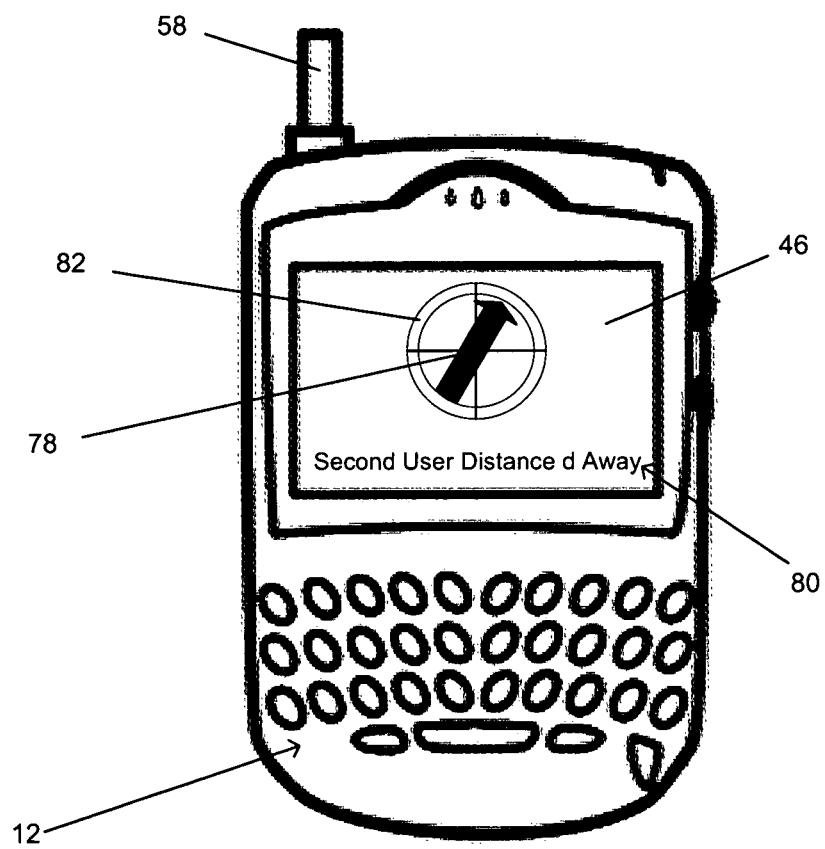
FIG. 5 is a front view of the portable electronic device of FIG. 2.

The arrow application 62 processes information from the direction API 66, the GPS API 68 and the destination API 70 to generate an arrow 78, which appears on the LCD display 46, as shown in FIG. 5. The arrow 78 continuously points toward the geographic location of the second portable electronic device 14. Text 80 is provided to specify the distance and identify which portable electronic device the arrow 78 is pointing toward. The arrow 78 is superimposed on a north arrow 82 in a manner similar to a compass.

The distance associated with the arrow 78 is determined based on the relationship between the geographic coordinates of the first portable electronic device 12 and the geographic coordinates of the second portable electronic device 14. The direction of the arrow 78 is determined using the direction information from the magnetic sensor hardware 54 and the relationship between the geographic coordinates of the portable electronic devices 12, 14. No map information is used by the portable electronic device 12, therefore, the magnetic sensor hardware 54 functions to provide a directional relationship between the geographic coordinates of the first portable electronic device 12 and the geographic coordinates of the second portable electronic device 14.

Arrow 78 will continue to be generated as long as the first portable electronic device 12 is able to receive GPS coordinates from the second portable electronic device 14. As such, the distance for which the arrow 78 may be generated is generally unlimited.

Operation of the pointing system 60 of the first portable electronic device 12 will now be described with reference to FIGS. 4 and 5. First, the geographic location and orientation of the first portable electronic device 12 is determined using the GPS hardware 52 and the magnetic sensor hardware 54, respectively. Then, the geographic coordinates of the second portable electronic device 14 are determined locally and sent to the first portable electronic device 12. The geographic coordinates are sent over the wireless network and infrastructure 24 via wireless communications with the base stations 16, 18, respectively, over a radio communications channel, as has been previously described. The geographic coordinates are continuously updated and re-sent to the first portable electronic device 12.

The GPS information, direction information and destination coordinates are then sent to the arrow application 62. The direction and distance from the first portable electronic device 12 to the second portable electronic device 14 is then calculated and an arrow 78 is provided on the display 46 to indicate the location of the second portable electronic device 14 together with optionally the distance calculated. The arrow 78 points toward the destination continuously. The direction of the arrow 78 is updated every time there is a change in any one of the direction information, the GPS information or the destination coordinates. As such, the first user is able to travel in a direct line toward the second user regardless of movement by either parties or reorientation of the first portable electronic device 12.

The arrow 78 may be any visual identifier that indicates a direction between a first point and a second point on the display 46. For example, an image of a person walking, a car driving, or an airplane flying in the direction of the destination may alternatively be displayed. Indicating the direction to the destination location is particularly useful when a line of vision to the destination is blocked, such as when traveling through bad weather or when navigating through a crowd, for example.

It will be appreciated that the first portable electronic device user is authorized to receive and view location information about the second portable electronic device user. Similarly, the second portable electronic device user may be authorized to receive and view location information about the first electronic device user. The authorization process between a pair of portable electronic device users is well known in the art and therefore will not be described here.

It will further be appreciated that although the pointing system 60 has been described with respect to the first portable electronic device 12, the second portable electronic device 14 may also include a pointing system 60. Any type of device, which is enabled with a positioning system such as GPS, for example, may be tracked by the pointing system 60. Such devices include cell phones, PDAs and laptop computers, for example.

In another embodiment, the geographic location is determined locally by both the first portable electronic device 12 and the second portable electronic device 14 based on signal strength from cell towers. The geographic location information is then processed in a similar manner as the geographic location information obtained using GPS technology.

In yet another embodiment, the first portable electronic device 12 is used for locating static destinations. Static destination coordinates that correspond to a restaurant, a friend's house or a landmark, for example, may be provided to the first portable electronic device 12. The destination coordinates are manually input into the first portable electronic device 12 by the first user. The geographic location and orientation of the first portable electronic device 12 is determined using the GPS hardware 52 and the magnetic sensor hardware 54, respectively. Then, the direction information, GPS information and destination coordinates are sent to the arrow application 62 and arrow 78 is generated on the display 46 in a manner that has been previously described. In addition to being manually input, the destination coordinates may alternatively be downloaded from a database or the internet.

In still another embodiment, geographic map information is downloaded onto the first portable electronic device. In this embodiment, the arrow 78 is superimposed onto a map. Rather than relying solely on the arrow direction to guide the first user, as has been described in the previous embodiments, the map provides a reference framework so that the first user can choose a map route that follows the arrow direction. It will be appreciated that the geographic map information may be used when locating both changing and static destination coordinates.

A specific embodiment has been shown and described herein. However, modifications and variations may occur to those skilled in the art. All such modifications and variations are believed to be within the sphere and scope of the present disclosure.

What is claimed is:

1. A method for indicating, on a display of a first portable electronic device, a location of a second portable electronic device, said method comprising:
   determining global location coordinates of said first portable electronic device;
   receiving global location coordinates of said second portable electronic device, said first portable electronic device being authorized in an authorization process to receive location information of said second portable electronic device;
   determining a relative direction from said first portable electronic device to said second portable electronic device;
   providing a visual identifier superimposed on a map that is provided on said display to represent said relative direction from said first portable electronic device to said second portable electronic device,
   wherein receiving of the global location coordinates of said second portable electronic device occurs continuously and without repeated requests from the first portable electronic device such that said visual identifier is updated continuously every time there is a change in said global location coordinates of said first portable electronic device or said second portable electronic device.

2. A method as claimed in claim 1, wherein said global location coordinates are sent from said second portable electronic device to said first portable electronic device.

3. A method as claimed in claim 1, wherein said global location coordinates of said second portable electronic device are manually input into said first portable electronic device.

4. A method as claimed in claim 1, wherein said global location coordinates of said second portable electronic device are downloaded from a database.

5. A method as claimed in claim 1, wherein said global location coordinates of said second portable electronic device are downloaded from the internet.

6. A method as claimed in claim 1, further comprising: providing text on said display to specify a distance between said first portable electronic device and said second portable electronic device.

7. A portable electronic device having a directional location system, said directional location system comprising:
   location determining hardware for providing global location coordinates of said portable electronic device;
   a destination application for receiving global location coordinates of a second portable electronic device, said portable electronic device being authorized in an authorization process to receive location information of said second portable electronic device;
   an electronic compass for determining a relative direction from said portable electronic device to said second portable electronic device;
   an arrow application for providing a visual identifier superimposed on a map that is provided on a display of said portable electronic device, said visual identifier representing said relative direction from said portable electronic device to said second portable electronic device,
   wherein the receiving of the global location coordinates of said second portable electronic device occurs continuously and without repeated requests from the first portable electronic device such that said visual identifier is updated continuously every time there is a change in said global location coordinates of said first portable electronic device or said second portable electronic device.

8. A portable electronic device as claimed in claim 7, wherein said device is arranged to receive the global location coordinates of said second portable electronic device from said second portable electronic device.

9. A portable electronic device as claimed in claim 7, wherein said device is arranged to receive the global location coordinates of said second portable electronic device by manually input into said portable electronic device.

10. A portable electronic device as claimed in claim 7, wherein said device is arranged to receive the global location coordinates of said destination are downloaded from a database.

11. A portable electronic device as claimed in claim 7, wherein said device is arranged to receive the global location coordinates of said second portable electronic device by downloaded from the internet.

12. A portable electronic device as claimed in claim 7, wherein said arrow application further provides text on said display to specify a distance between said first portable electronic device and said second portable electronic device.

13. A method as claimed in claim 1, wherein said first portable electronic device specifies said second portable electronic device as a device to track prior to receiving global location coordinates therefrom.

14. A portable electronic device as claimed in claim 7, wherein said portable electronic device specifies said second portable electronic device as a device to track prior to receiving global location coordinates therefrom.

15. A method as claimed in claim 1, wherein said visual identifier is updated when there is a change in said global location coordinates of said first portable electronic device and said second portable electronic device.

16. A portable electronic device as claimed in claim 7, wherein said visual identifier is updated when there is a change in said global location coordinates of said portable electronic device and said second portable electronic device.

17. A method as claimed in claim 1, wherein said visual identifier is an arrow.

18. A method as claimed in claim 1, wherein said relative direction from said first portable electronic device to said second portable electronic device is determined using an electronic compass.

19. A portable electronic device as claimed in claim 7, wherein said arrow application is arranged to provide an arrow as the visual identifier.

20. A method as claimed in claim 1, wherein the visual identifier is updated every time there is a change in any of the global location coordinates of said first portable electronic device, the global location coordinates of said second portable electronic device, or said relative direction.

21. A portable electronic device as claimed in claim 7, wherein the visual identifier is updated every time there is a change in any of the global location coordinates of said first portable electronic device, the global location coordinates of said second portable electronic device, or said relative direction.

22. The method as claimed in claim 1, further comprising downloading the map from a network.

23. The method as claimed in claim 1, wherein the superimposing of the visual identifier on the map is at the global location coordinates of said first portable electronic device.

24. The method of claim 23, wherein the global location coordinates of said second portable electronic device are not displayed on the map.

* * * * *